United States Patent [19]

Walker

[11] 4,054,064

[45] Oct. 18, 1977

[54] MULTISIDED GUARD

[76] Inventor: Brooks Walker, 807 Francisco St., San Francisco, Calif. 94109

[21] Appl. No.: 597,879

[22] Filed: July 21, 1975

Related U.S. Application Data

[63] Continuation of Ser. No. 484,678, July 1, 1974, abandoned.

[51] Int. Cl.² ............................................. F16P 1/00
[52] U.S. Cl. ........................................ 74/612; 100/53
[58] Field of Search ............. 52/70, 71, 111; 100/53; 192/133, 134; 83/543, 544, 546; 296/23 F, 23 D, 23 G, 108; 160/113, 137, 138, 139, 160, 162; 74/608, 609, 612; 220/331, 255, 322, 333, 345, 347, 85 A, 85 B; 312/283, 285, 247, 248, 251

[56] References Cited

U.S. PATENT DOCUMENTS

| 3,321,233 | 5/1967 | Davis | 52/71 |
| 3,629,982 | 12/1971 | Ballay | 52/71 |
| 3,798,998 | 3/1974 | Connors | 74/612 |

FOREIGN PATENT DOCUMENTS 539,532  11/1931  Germany ........................ 296/23 D Primary Examiner—John E. Murtagh
Attorney, Agent, or Firm—Gordon Wood

[57] ABSTRACT

A multisided guard for guarding a space containing, for example, a hazardous operation from which personnel are to be protected. The guard comprises a plurality of vertically extending walls, each comprising a pair of upper and lower panels which are adapted to be swung from a lower position covering the space to an upper position uncovering the space.

3 Claims, 11 Drawing Figures

U.S. Patent Oct. 18, 1977 Sheet 1 of 2 4,054,064
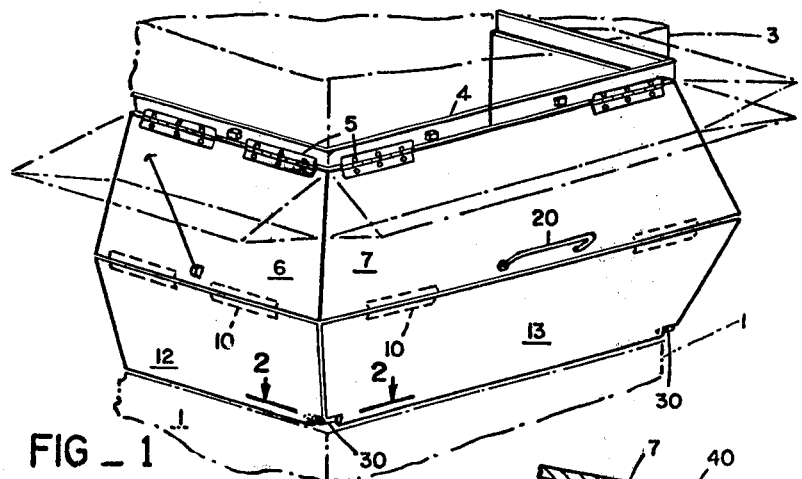
FIG_1
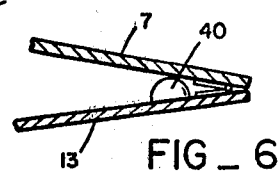
FIG_6
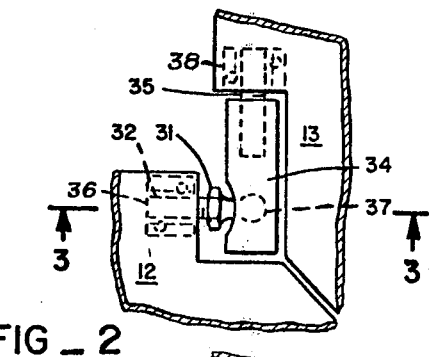
FIG_2
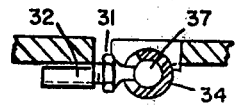
FIG_3
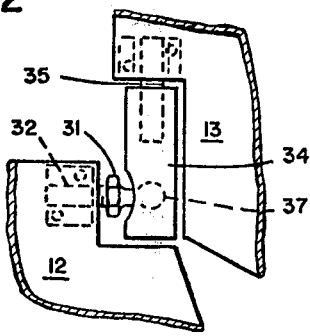
FIG_4
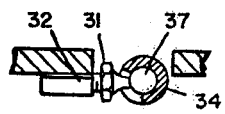
FIG_5

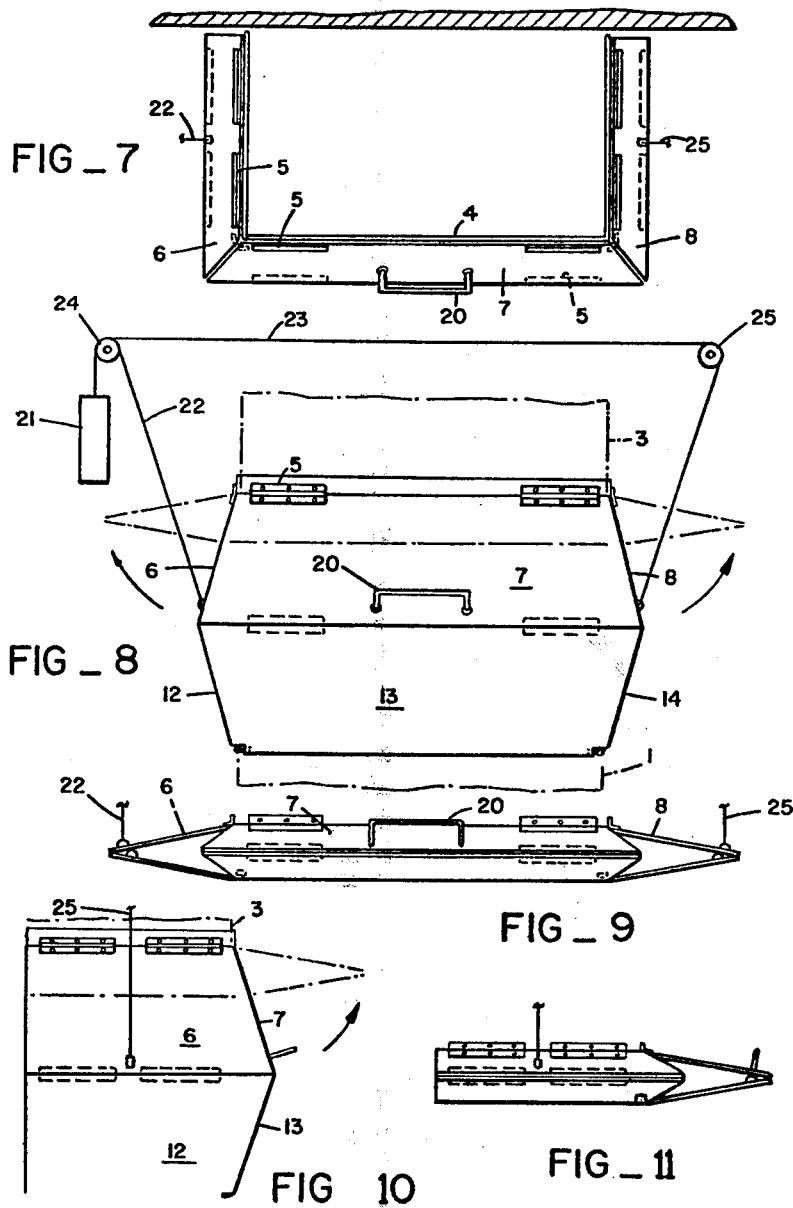

MULTISIDED GUARD

This is a continuation of Ser. No. 484,678, filed July 1, 1974, and now abandoned.

This invention relates to a safety guard for protecting personnel from a hazard such as may exist in a punch press operation or similar operation.

Numerous types of safety guards have been provided in the past to protect personnel from one open side of a punch press or similar mechanism which may constitute a hazard to such personnel. In many situations it is desirable to protect personnel from a hazard which may exist on more than one side of a space. The main object of the present invention is therefore the provision of a multisided guard which in its closed position provides protection on more than one side of a space.

Another object of the invention is the provision of an extremely inexpensive multisided guard which is easily installed and is subject to operation in a simple manner.

Other objects and advantages of the invention will be apparent from the following specification and from the drawings.

FIG. 1 is a perspective of a preferred form of the invention for protecting a space along three vertically extending sides.

FIG. 2 is a fragmentary horizontal section taken in a plane indicated by lines 2—2 of FIG. 1 and showing the pivot means FIG. 3 is a fragmentary section taken in a plane indicated by lines 3—3 of FIG. 2.

FIG. 4 is a view similar to FIG. 2 but showing the pivot when the walls are in their upper position.

FIG. 5 is a view similar to FIG. 3 and corresponding to the position of FIG. 4.

FIG. 6 is a sectional view through a pair of wall panels in their upper position and showing the bumper.

FIG. 7 is a top plan view of the structure of FIG. 1.

FIG. 8 is a front elevation of the structure of FIG. 1 showing the counterweight.

FIG. 9 is a view similar to FIG. 8 but with the guard in its upper open position.

FIG. 10 is an end elevation of the guard in its lower position.

FIG. 11 is an end elevation of the guard in its upper position.

In detail, and first with reference to FIG. 1, one form of the invention is shown in a situation wherein it is desired to protect a space along three of the sides of such space. For example, the mechanism from which protection is sought may include a horizontally extending portion 1 defining the lower side of the space to be protected. The safety guard is secured to the upper portion 3 of the press or other machine to be guarded. The connection may be made by means of flat bars 4 which may be secured to the upper portion 3 by means of bolts. Hingedly secured to the flat bars 4 by hinges 5 are three upper panels designated 6,7,8. It will be noted that said panels are trapezoidal with the lower edges being longer than the upper edges.

Hingedly secured by hinges 10 to the lower edges of panels 6,7,8 are lower panels 12, 13, 14 which are similar to panels 6,7,8, but which have their long edges hinged to the long edges of the upper panels. As best seen in FIGS. 8 and 10, when the panels are in their lower position with the lower edges of the lower panels adjacent the lower portion 1 of the machine, all of the panels make a small angle, preferably about 15°, with the vertical. This is to prevent the panels from locking together which would tend to happen if corresponding upper and lower panels were both disposed in a common vertical plane. With the side walls of the guard covering the space to be protected it will be noted that there is no particular interference to the panels being swung upwardly to the position shown in FIG. 9.

For the purpose of swinging the guard upwardly and downwardly, a handle 20 is provided on the upper front panel 7. In order to permit the guard to remain in whatever position it is moved to, a counterweight 21 may be provided to place tension in lines 22, 23 which in turn are reeved about pulleys 24, 25 and connected to panels 6, 8 as shown in FIG. 8.

The lower panels 12, 13 are connected together at their lower adjoining corners, as are lower panels 13, 14, by means of a connection shown in FIGS. 2–5. Such connection comprises a ball and socket joint wherein the ball portion 31 may be connected to boss 36 on panel 12 by means of its threaded shank 32 and the socket portion 34 connected to panel 13 by means of a threaded shank 35 which is threadedly secured within socket portion 34 and also to threaded boss 38 on the panel 13. The arrangement of FIGS. 2, 4 should preferably be such that the center of the ball 37 is close to the same vertical line as the intersection of the axes of the hinges 5 which secure the panels 6, 7 at their upper edges. In this manner said ball moves substantially in said vertical line.

When the guard is moved to its up position it is preferable to prevent any impact between the upper and lower panels by providing a bumper 40 on one of the corresponding upper and lower panels as shown in FIG. 6.

It will be apparent that the particular shape of guard shown in FIG. 1 is not critical and it will also be apparent that the upper panels may be supported from above by any suitable structure above the space to be guarded. It will also be obvious that this construction may be used to guard a space having more than three sides to be guarded. In certain instances the shape of the guard as shown in FIG. 12 may be preferable wherein the shape of upper portion 3' is trapezoidal.

The ball and socket joint shown in FIGS. 2–5 simplifies the assembly of the device since minor inaccuracies in alignment are not of great consequence. However, the structure shown in FIGS. 13, 14 may be employed wherein the portions 34' are pivotally connected together by pivot 37' and connected to panels 12, 13 by means of threaded studs 31' and 35'. In such a case, the pivot 37' should be in the same vertical line as the intersection of the axes of the hinges which secure the upper panels to the top.

I claim:

1. A safety guard for protecting a pair of adjoining intersecting vertically extending sides of a space comprising:
   a pair of vertically extending walls covering said sides,
   each of said walls including an upper trapezoidal panel having upper and lower horizontally disposed edges,
   a fixed mount,
   means hingedly supporting the upper panels of said walls to said mount for swinging movement in vertical planes about horizontally extending axes in intersecting relation, each of said walls including a lower trapezoidal panel hingedly secured along its upper edge to the lower edge of its corresponding upper panel, and a pivot pivotally securing said lower panels together adjacent their lower edges with the adjacent side edges of said upper panels and the adjacent edges of said lower panels being unsecured except at said pivot to permit each pair of upper and lower panels to be swung upwardly to substantially face to face relationship, the lower edge of each upper panel being longer than its upper edge, and the upper edge of each lower panel being longer than its lower edge to prevent corresponding upper and lower panels from being swung to coplanar relationship thereby facilitating swinging each of said walls from a lower to an upper position.

2. A safety guard according to claim 1 wherein said means for pivotally securing said lower panels together comprises a universal joint to facilitate vertical movement of said walls.

3. A safety guard according to claim 1 wherein a third wall having similar upper and lower panels is connected to one of said pair of walls to define a space inwardly of said walls.

* * * * *